United States Patent [19]

Shimoyashiki et al.

[11] Patent Number: 4,996,020
[45] Date of Patent: Feb. 26, 1991

[54] A SYSTEM FOR RESTRAINING DIFFUSION OF TRITIUM

[75] Inventors: Shigehiro Shimoyashiki; Ryuhei Kawabe, both of Hitachi, Japan

[73] Assignee: Hitachi, Ltd., Tokyo, Japan

[21] Appl. No.: 409,589

[22] Filed: Sep. 15, 1989

[30] Foreign Application Priority Data

Sep. 21, 1988 [JP] Japan .................. 63-235027

[51] Int. Cl.$^5$ ............................. G21C 19/42
[52] U.S. Cl. ................... 376/313; 376/309; 376/305
[58] Field of Search ............... 376/313, 305, 309, 314, 376/291, 292, 900

[56] References Cited

U.S. PATENT DOCUMENTS

| | | | |
|---|---|---|---|
| H326 | 9/1987 | Brager et al. | 420/63 |
| 4,031,921 | 6/1977 | Maroni et al. | 138/140 |
| 4,298,804 | 11/1981 | Colditz | 376/108 |
| 4,314,880 | 2/1982 | McGuire et al. | 376/146 |
| 4,395,386 | 7/1983 | Asakura et al. | 423/249 |
| 4,597,936 | 7/1986 | Kaae | 376/411 |
| 4,663,111 | 5/1987 | Kim et al. | 376/185 |

Primary Examiner—Stephen J. Lechert, Jr.
Assistant Examiner—Nina Bhat
Attorney, Agent, or Firm—Antonelli, Terry, Stout & Kraus

[57] ABSTRACT

A method of restraining a diffusion of tritium and an apparatus for same are disclosed. The method includes the step of disposing a hydrogen-absorbing metal in a tritium passage in a direction of diffusion of tritium so that the hydrogen-absorbing metal absorbs tritium to be diffused. The apparatus includes a hydrogen-absorbing metal surrounding a device of a fast breeder reactor. The tritium to be diffused can be readily captured. An arrangement of capturing the tritium permeating the device is simplified in the present invention.

8 Claims, 2 Drawing Sheets

4,996,020

A SYSTEM FOR RESTRAINING DIFFUSION OF TRITIUM

BACKGROUND OF THE INVENTION

1. Field of the invention

The present invention relates to a method of restraining a diffusion of tritium and an apparatus for same.

2. Description of the Related art

In general, a fast breeder reactor comprises an arrangement of devices as shown in FIG. 3. In FIG. 3, a reactor vessel made of stainless steel is indicated at 1. The reactor vessel 1 contains a reactor core 2 in which a nuclear fuel assembly comprising a fissionable material is placed. The reactor core 2 receives a control rod 3 including boron so that the control rod 3 can be pulled up and inserted into the reactor core 2 from above. The fast breeder reactor has a primary cooling system piping 4 made of stainless steel and causing liquid sodium as a coolant to pass through the reactor core 2 in the reactor vessel 1 and to circulate by means of a pump 5 between the reactor vessel 1 and an intermediate heat exchanger 6. The fast breeder reactor also has a secondary cooling system piping 7 made of stainless steel and causes liquid sodium as a coolant of a secondary cooling system to circulate by means of a pump 8 between the intermediate heat exchanger 6 and a steam generator 9. A steam system piping feeding water to the steam generator 9 to receive steam therefrom is indicated at 10.

Both the primary and secondary cooling system pipings 4 and 7 have heat reserving means. The arrangement of each of the heat reserving means is as follows: FIG. 4 illustrates the arrangement of a piping 11 which is assumed to represent each of the primary and secondary cooling system pipings 4 and 7. As shown in FIG. 4, a stainless steel strip 13 surrounds both the piping 11 made of stainless steel in view of both resistance against corrosion caused by liquid sodium and a high-temperature strength and a preheater 12 arranged in parallel to the piping 11, a heat reserving material 14 surrounds the stainless steel strip 13, and a thin steel strip 15 surrounds the heat reserving material 14. The thickness of each of the stainless steel strip 13 and the steel strip 15 is normally about 0.1 mm–0.2 mm. The reserving material 14 normally is a mixture including calcium oxide or silicon oxide as a main component.

Turning back to FIG. 3, a fission reaction in the reactor or a nuclear transformation caused by neutron irradiation of the boron used as a moderator of the control rod 3 produces tritium. For example, in a nuclear reactor of one million KW tritium of about 1 g/year occurs. The tritium is mixed with liquid sodium passing through the reactor core 2 and transferred through the primary cooling system piping 4 to the intermediate heat exchanger 6. Then, the tritium permeates the wall of a heat-transfer pipe of the intermediate heat exchanger 6 and enters liquid sodium contained in the secondary cooling system piping 7 to reach the steam generator 9. Thus, the tritium permeates the pipings and devices, so that the tritium tends to readily permeate and diffuse in atmospheres outside of the devices. In particular, it is well known that tritium permeates stainless steel used to constitute the devices of a nuclear power plant. Thus, tritium permeating e.g. the piping 11 inside to outside permeates the heat reserving means to diffuse to the outside thereof.

Since as described above, the tritium which has once diffused continues to diffuse and in the worst case, might diffuse in the atmosphere, the diffusion of the tritium must be restrained.

SUMMARY OF THE INVENTION

An object of the present invention is to provide a method of restraining a diffusion of tritium and an apparatus for same.

In order to achieve this object, a method of the invention for restraining a diffusion of tritium comprises the step of disposing a hydrogen-absorbing metal in a tritium passage in the direction of diffusion of tritium so that the hydrogen-absorbing metal absorbs tritium to be diffused.

An apparatus of the invention for restraining a diffusion of tritium, comprises a hydrogen-absorbing metal surrounding a device of an fast breeder reactor.

According to the invention, since the hydrogen-absorbing metal well absorbs tritium constituting an isotope of hydrogen, the hydrogen-absorbing metal disposed in the tritium passage in the direction of diffusion of tritium absorbs and captures the tritium, the tritium is restrained in diffusing anywhere.

DESCRIPTION OF THE PREFERRED EMBODIMENTS

Hereinafter, the preferred embodiments of the present invention will be described with reference to the drawings.

Figure 1:
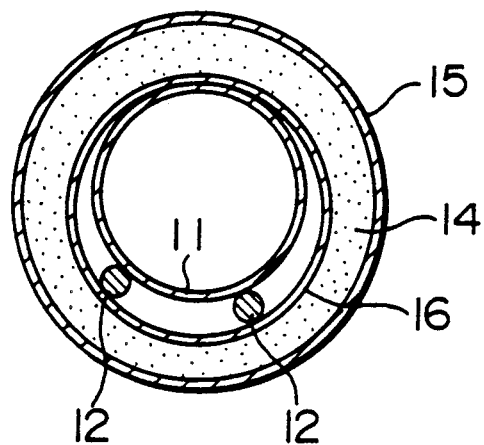
FIG. 1 is a cross-section of a piping showing one embodiment of the present invention.

FIG. 1 illustrates one embodiment of the present invention which has been applied to a piping of a fast reactor. Hereinafter, the same portion of FIGS. 2, 5 and 6 as that of FIGS. 1 and 3 carries the same reference number.

A tubular thin strip 16 made of a hydrogen-absorbing metal surrounds a piping 11 and a preheater 12 mounted in parallel to the outer surface of the piping 11. The thin strip 16 was 0.1 mm to several mm in thickness. However, the thickness of the thin strip 16 is not, of course, restricted to this value. The hydrogen-absorbing metal for the thin strip 16 is, e.g., $Mg_2Ni$ and a Ti-Mn based alloy such as $TiMn_{1.5}$. The outer cylindrical surface of the thin strip 16 has a heat reserving material or heat insulator 14 disposed thereon. Along the outer circumference of the heat reserving material 14 is disposed a thin steel strip 15 to confine the material 14. A sheet of a hydrogen-absorbing metal e.g. Ti-Mn based alloy may be used instead of the thin steel strip 15. Thus, there are three cases, that is, a first case in which along the inner periphery of the heat reserving material 14 is disposed the hydrogen-absorbing metal, a second case in which along the outer periphery of the heat reserving material 14 is disposed the hydrogen-absorbing metal, and a third case in which along both the outer and inner peripheries of the heat reserving material 14 are disposed the hydrogen-absorbing metals.

Figure 2:
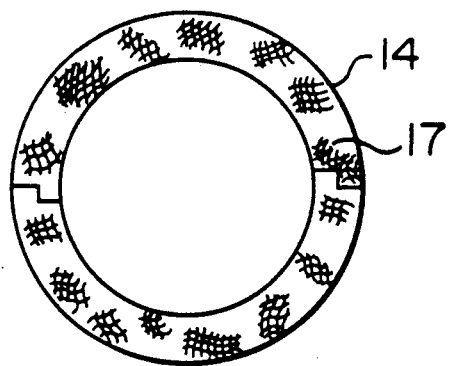
FIG. 2 is a cross-section of a heat reserving arrangement showing another embodiment of the present invention.
Figure 3:
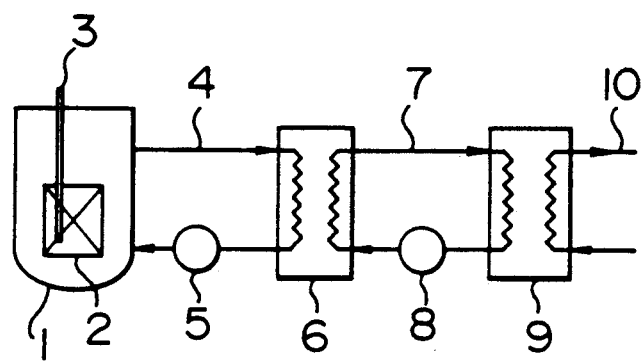
FIG. 3 is a block diagram illustrating a primary cooling system of a fast breeder reactor.
Figure 4:
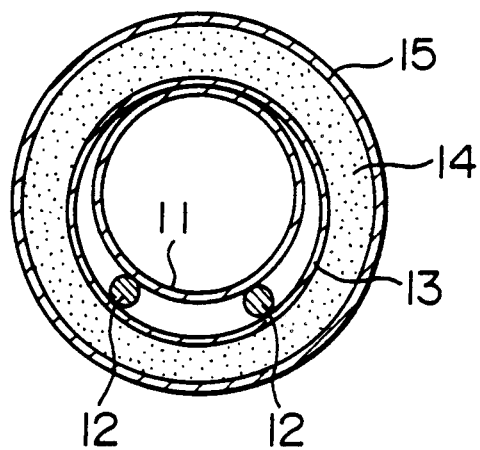
FIG. 4 is a cross-section of a heat reserving arrangement of a prior-art piping.

FIG. 2 illustrates a cross-section of a heat reserving arrangement showing another embodiment of the invention. A heat reserving material 14 includes a hydrogen-absorbing metal 17 scattered therein at a rate of 0.1 to 0.3 g/cm$^2$ in the form of fiber (alternatively, chip or powder) so that the heat reserving material 14 and the hydrogen-absorbing metal 17 are uniformly mixed with each other. The heat reserving material 14 is normally divided into blocks for easy handling.

Figure 5:
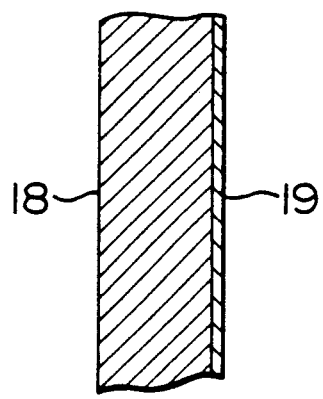
FIG. 5 is a section of the wall of a piping showing a still another embodiment of the present invention.

FIG. 5 illustrates the wall arrangement of a piping showing still another embodiment of the present invention. The wall arrangement of the piping 11 comprises a wall 18 and a layer made of a hydrogen-absorbing metal 19 e.g. Ti-Mn based alloy which layer is jointed by spot-welding or by use of fittings such as bands, bolts and nuts, or is sprayed or coated integrally to the outer surface of the wall 18.

Figure 6:
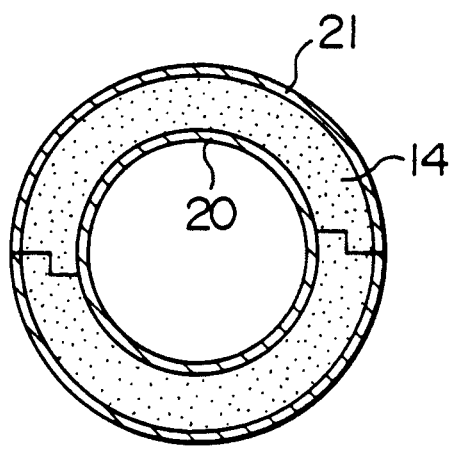
FIG. 6 is a cross-section of a heat reserving arrangement of a piping showing another embodiment of the present invention.

FIG. 6 illustrates a piping showing another embodiment of the invention. A piping has an arrangement in which the inner cylindrical wall 20 or outer cylindrical wall 21 for conbining the heat reserving material 14 has a layer made of the hydrogen-absorbing metal 19 e.g. Ti-Mn based alloy which layer is jointed or sprayed or coated integrally to the inner or outer cylindrical wall 20 or 21.

While Ti-Mn alloy composition was used as the hydrogen-absorbing metal, the following alloy compositions may be alternatively employed: Mg-Ni, Mg$_2$Ni, Mg$_2$Ni$_{0.9}$Cr$_{0.1}$, LaNi$_5$, MmNi$_5$, MmCo$_5$, MmNi$_{4.5}$Mn$_{0.5}$, MmNi$_{4.5}$Al$_{0.5}$, MmNi$_{4.5}$Cr$_{0.5}$, TiFe, TiCr, TiCr$_2$, TiFe$_{0.9}$Nb$_{0.1}$, Ti-Zr-Mn-Mo, Ti-Mn-Fe-V, Ti-Zr-Mn-Fe and CaNi$_5$. The character "Mm" represents a miSch metal consisting of a mixture of La, Ce, Pr, Nd, Sm and the like.

In accordance with the above embodiments of the invention, tritium which occurs in the reactor core and may escape through the wall of the piping of the reactor to an outside atmosphere can be captured near the surface of the piping, so that a contamination of the outside atmosphere i.e. radiation exposure can be reduced and a gas cleaner in a containment vessel containing the reactor vessel can be simplified.

What is claimed is:

1. A system for restraining diffusion of tritium, comprising a heat reserving means which is mounted to a device of a fast breeder reactor and which includes a hydrogen-absorbing metal.

2. A system for restraining diffusion of tritium as recited in claim 1, wherein said heat reserving means comprises an inner wall surrounding the device, a heat reserving material surrounding the exterior of the inner wall, and an outer wall surrounding the exterior of the heat reserving material, at least one of the inner and outer walls being made of the hydrogen-absorbing metal.

3. A system for restraining diffusion of tritium as recited in claim 1, wherein said heat reserving means comprises an inner wall surrounding the device, a heat reserving material surrounding the exterior of the inner wall, and an outer wall surrounding the exterior of the heat reserving material, at least one of the inner and outer walls being provided with the hydrogen-absorbing metal mounted thereto.

4. A system for restraining diffusion of tritium as recited in claim 1, wherein said heat reserving means comprises an inner wall surrounding the device, a heat reserving material surrounding the exterior of the inner wall, and an outer wall surrounding the exterior of the heat reserving material, said heat reserving material being made of the hydrogen-absorbing metal.

5. A system for restraining diffusion of tritium as recited in claim 1, wherein said heat reserving means comprises an inner wall surrounding the device, a heat reserving material surrounding the exterior of the inner wall, and an outer wall surrounding the exterior of the heat reserving material, said heat reserving material being provided with the hydrogen-absorbing metal mixed therewith.

6. A system for restraining diffusion of tritium as recited in claim 1, wherein said heat reserving means comprises an inner wall surrounding the device, a heat reserving material surrounding the exterior of the inner wall, and an outer wall surrounding the exterior of the heat reserving material, said heat reserving material being provided with the hydrogen-absorbing metal mixed therewith in the form of fiber, chip or powder.

7. A system for restraining diffusion of tritium as recited in claim 1, wherein said hydrogen absorbing metal is an alloy selected from the group consisting of Ti-Mn, Mg-Ni, Mg$_2$Ni, Mg$_2$Ni$_{0.9}$Cr$_{0.1}$, LaNi$_5$, MmNi$_5$, MmCo$_5$, MmNi$_{4.5}$Mn$_{0.5}$, MmNi$_{4.5}$, MmNi$_{4.5}$, TiFe, TiCr, TiCr$_2$, TiFe$_{0.9}$Nb$_{0.1}$, Ti-Zr-Mn-Mo, Ti-Mn-Fe-V, Ti-Zr-Mn-Fe and CaNi$_5$ in which Mm represents a misch metal consisting of a mixture of La, Ce, Pr, Nd and Sm.

8. A system for restraining diffusion of tritium as recited in claim 1, wherein said hydrogen-absorbing metal strains diffusion of the tritium by absorbing tritium occurring in the fast breeder reactor.

* * * * *